March 15, 1938.  H. W. MITCHELL  2,111,221
SUB-ATMOSPHERIC PRESSURE INDICATING INSTRUMENT
Filed Nov. 4, 1935
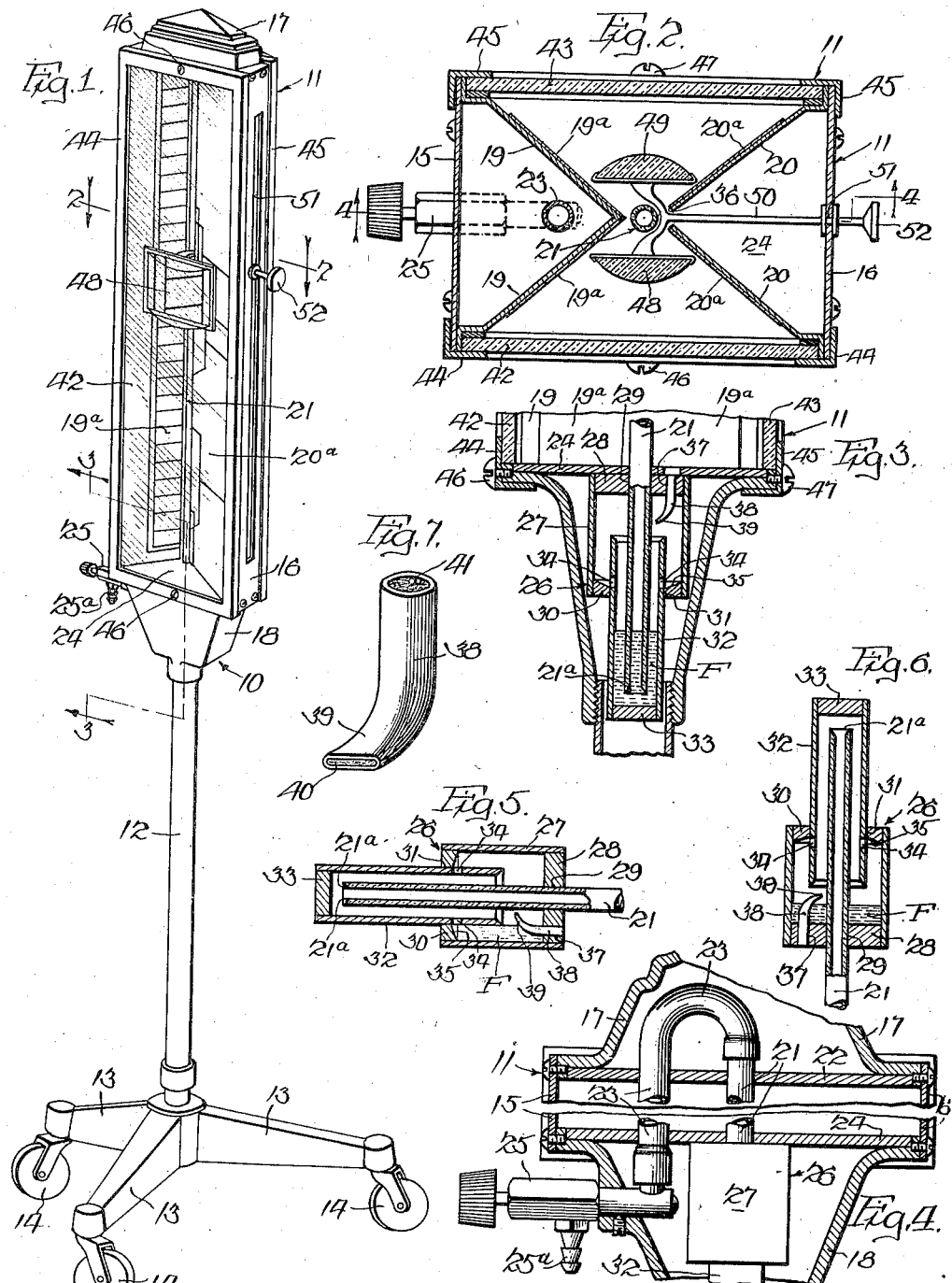
Inventor:
H. Walter Mitchell
By Leo. Dubois  Atty.

Patented Mar. 15, 1938

2,111,221

UNITED STATES PATENT OFFICE 2,111,221

SUB-ATMOSPHERIC PRESSURE INDICATING INSTRUMENT

Henry Walter Mitchell, Chicago, Ill., assignor to Emil A. Stromberg, Chicago, Ill.

Application November 4, 1935, Serial No. 48,079

6 Claims. (Cl. 73—31)

The present invention relates to improvements in a portable indicating instrument or manometer employing a chart and having a vertical column coacting therewith into which a fluid such as mercury, etc., is adapted to be drawn to indicate and check the suction qualities of various suction devices that may be attached thereto.

The chief objects of the invention is the provision of an indicating device which is simple in construction, strong and durable, inexpensive to manufacture and accurate in operation, being easily attached to various suction devices to indicate the amount of suction produced thereby.

Another object is the provision of a pair of charts arranged on opposite sides of a fluid column and visible on two sides of the instrument rendering the fluid level in the column readable on both sides of the instrument during the checking operations of the device attached thereto.

A further object is the provision of a fluid container coacting with the fluid column which permits the fluid therein to be easily drawn in the fluid column and which is adapted to trap and withhold the fluid therein during the transporting and handling of the instrument; to provide the container with an air vent that is arranged and constructed to permit of the admission of air within the container while retaining the fluid therein against accidental leakage.

And a further object is the provision of a manually controlled valve forming a seal to trap the fluid within the container.

And a still further object is the provision of manually adjustable magnifying means coacting with the fluid column and accessible outwardly of the instrument for adjusting its position with respect to the fluid level for rendering the same and the chart visible in enlarged scale.

Referring to the drawing:

Figure 1 is a detail perspective view of the indicating instrument embodying my invention.

Figure 2 is an enlarged detail cross-sectional view taken substantially on the line 2—2 of Figure 1.

Figure 3 is an enlarged partial vertical medial sectional view taken substantially on the line 3—3 of Figure 1.

Figure 4 is a vertical sectional view taken substantially on the line 4—4 of Figure 2 and partially broken away illustrating the flexible connection from the transparent tubular member to the manually controlled valve.

Figure 5 is a detail cross-sectional view of the fluid container illustrating the position assumed by the fluid while in a horizontal position.

Figure 6 is a detail cross-sectional view of the fluid container illustrating the position assumed by the fluid while in inverted position; and Figure 7 is a detail perspective view of the vent member associated with the fluid container.

The reference numeral 10 designates the indicating instrument as a whole, comprising a casing 11 supported on a standard 12 provided with a plurality of horizontally disposed legs 13 that are each provided with a caster 14 rendering the instrument easily movable to be attached to various devices.

The casing 11 comprises the side walls 15 and 16 respectively, which are secured to the upper cap member 17 and to the lower cap member 18 and have the inwardly directed V-shaped members 19 and 20 respectively, fixed thereto which have their apexes directed toward each other and form a space therebetween through which a transparent tubular member 21 extends. The upper end of the tubular member 21 extends through a partition wall 22 in the cap member 17 and has a flexible tube 23 connected thereto that is directed downwardly through the partition wall 22 and extends within the V-shaped member 19 and through a partition wall 24 fixed in the lower cap member 18 and is connected to a manually controlled valve 25.

The lower end of the transparent tubular member 21 extends centrally of the instrument and through the partition wall 24 into a container 26 that is provided with an enlarged body portion 27 having a top wall 28 provided with an opening 29 therein through which the tube 21 extends and which is sealed in position therewith. The main body portion 27 of the container has a bottom wall 30 provided with an opening 31 therein adapted to receive a reduced body portion 32 which is glued or otherwise secured in position and which has a bottom wall 33 adjacent which the lower end of the transparent tubular member 21 extends. The reduced body portion 32 of the container 26 is secured to the enlarged body portion 27 with its upper portion extending about midway therein. This reduced portion 32 is provided with a plurality of openings 34 therein that are aligned with the inner surface 35 of the bottom wall 30 of the enlarged body portion 27 and serve to permit the fluid to flow from one portion to the other as the instrument is tilted. A fluid F such as mercury or the like, is placed within the reduced body portion 32 through an opening 37 in the top wall 28 of the enlarged body portion 27 of the container which is sealed against leakage of the fluid by means of a vent member 38 which has its inner end portion reduced at 39 to provide a relatively long and narrow slot opening 40 and is filled with cotton or other suitable filtering material 41. The vent member 38 is curved at the end portion 39 and is positioned in the opening 37 with this end portion 39 directed toward the tubular member 21 so that regardless of the position to which the instrument is turned, the fluid level will always be below the slot opening 40 therein. (Figures 3, 5 and 6.) While I have shown the device employing a single vertical transparent column, a plurality of columns may be employed and the container 26 for the fluid would be enlarged in proportion to the amount of fluid required to be drawn in these columns when the device is being used.

As thus far described, it will be noted that the fluid F is normally retained within the reduced portion 32 of the container 26 while the instrument is in its normal upright position and the lower end of the tube 21 normally extends into the fluid and is provided with a bevelled annular edge 21a to permit of a free and easy admittance of the fluid into the tube. Should the instrument be placed on its side and the container 26 assume the position as shown in Figure 5, the fluid will then run out of the reduced portion 32 through the openings 34 into the enlarged portion 27 thereof, or should the instrument be inverted, the fluid will be carried from the reduced portion 32 to the enlarged portion 27 of the container as shown in Figure 6.

The front and back walls 42 and 43 respectively, of the casing 11 are preferably of transparent material such as glass, etc., which is held in position by means of the frame members 44 and 45 secured to the cap members 17 and 18 by means of the screws 46 and 47.

The V-shaped portions 19 and 20 of the casing 11 each has a chart 19a or 20a fixed thereon that extends its entire length and is provided with graduations for indicating the fluid level within the transparent tube 21.

To render the fluid level and the charts visible on an enlarged scale, I provide the lenses 48 and 49 arranged for vertical sliding movements on opposite sides of the tube 21. These lenses are of sufficient size to render the charts and the fluid level in the tube visible therethrough and are carried on a frame member 50 that extends through an elongated slot opening 36 in the V-shaped member 20 and through an elongated slot opening 51 in the side wall 16 of the casing 11. The frame 50 is provided with a hand grip 52 for positioning the lenses 48 and 49 to the various levels assumed by the fluid while checking different suction devices and for magnifying the charts and the fluid level rendering them readily visible to the operator.

The valve 25 of the instrument is provided with a downwardly extending portion 25a to which a suction device to be tested may be readily attached. The valve 25 is then turned to open position permitting the suction of the device to draw through the flexible tube 23 and the transparent tubular member 21 to the container 26. This drawing action to the container 26 causes the fluid F therein to be drawn into the tubular member 21 to an elevation equivalent to the suction produced by the device and the fluid level is then registered by means of the charts 19a and 20a. To more accurately check the reading of the charts with the fluid level, the lenses 48 and 49 may be moved by means of the hand grip 52 and render the chart and fluid level visible on an enlarged scale.

I contemplate as being included in these improvements, all such changes, variations and departures from what is thus specifically illustrated and described as fall within the scope of the appended claims.

I claim:

1. An indicating instrument adapted to be connected to a suction device for determining the amount of suction produced thereby, comprising a rectangular casing having transparent front and back walls, a hollow transparent column disposed substantially vertically therein, a container for a fluid attached to the lower end of the column and having a fluid therein, a pair of vertically disposed V-shaped members having their walls converging toward the column and in opposed relation on each side thereof, and a chart on each of said V-shaped members visible through the transparent front and back walls.

2. An indicating instrument adapted to be connected to a suction device for determining the amount of suction produced thereby, comprising a casing having open front and back walls, transparent plates enclosing the front and back walls, a hollow transparent column disposed vertically in said casing and visible through the transparent plates of the front and back walls, a container fixed to the lower end of said column and having a fluid therein, and a chart arranged on opposite sides of said column visible through the transparent front and back walls of the instrument.

3. An indicating instrument adapted to be connected to a suction device for determining the amount of suction produced thereby, comprising a casing and a hollow transparent tube disposed vertically in said casing, a fluid container fixed to the lower end of said tube provided with a fluid therein, said container being arranged with upper and lower compartments, said lower compartment extending partially within the upper compartment and having a plurality of openings therein permitting the fluid to flow from one compartment to the other when the instrument is tilted.

4. An indicating instrument of the character described, comprising in combination, a casing having transparent front and back walls and opaque side and top and bottom walls, a vertically disposed hollow transparent column within the casing and visible through the front and back walls thereof, a container for a fluid attached to the lower end of said column and having a fluid therein, a scale extending along each side of said column and visible through the transparent front and back walls.

5. An indicating instrument adapted to be connected to a suction device for determining the amount of suction produced thereby, comprising a casing having transparent front and back walls, a transparent tubular column disposed substantially vertically and centrally within the casing, a container for a fluid attached to the lower end of the column and having a fluid therein, said container being arranged with a relatively large upper compartment and a small lower compartment and with the lower end of the tube extending into the lower compartment, and a chart on each side of the tube and visible through the transparent front and back walls.

6. The combination of claim 5 hereof in which the lower compartment of the container is provided with openings therein permitting the liquid to flow therethrough from said lower compartment to the upper compartment when the instrument is tilted.

HENRY WALTER MITCHELL.